United States Patent
Tanase et al.

(10) Patent No.: US 6,655,713 B2
(45) Date of Patent: Dec. 2, 2003

(54) AIR BAG

(75) Inventors: Toshinori Tanase, Aichi-ken (JP);
Choko Tanabe, Aichi-ken (JP);
Masayuki Kato, Kariya (JP)

(73) Assignees: Toyoda Gosei Co., Ltd., Aichi-ken
(JP); Toyoda Boshoku Corporation,
Kariya (JP)

( * ) Notice: Subject to any disclaimer, the term of this patent is extended or adjusted under 35 U.S.C. 154(b) by 106 days.

(21) Appl. No.: 09/883,206

(22) Filed: Jun. 19, 2001

(65) Prior Publication Data
US 2002/0000713 A1 Jan. 3, 2002

(30) Foreign Application Priority Data
Jun. 30, 2000 (JP) ......................................... 2000-199393

(51) Int. Cl.[7] ............................................... B60R 21/16
(52) U.S. Cl. ................................. 280/743.1; 280/730.2
(58) Field of Search .............................. 280/729, 730.1, 280/730.2, 743.1, 743.2

(56) References Cited

U.S. PATENT DOCUMENTS

| | | | | |
|---|---|---|---|---|
| 6,010,149 A | * | 1/2000 | Riedel et al. | 280/729 |
| 6,056,316 A | * | 5/2000 | Yamaji et al. | 280/730.1 |
| 6,129,377 A | * | 10/2000 | Okumura et al. | 280/730.2 |
| 6,199,898 B1 | * | 3/2001 | Masuda et al. | 280/729 |
| 6,237,937 B1 | * | 5/2001 | Kokeguchi et al. | 280/730.2 |
| 6,293,581 B1 | * | 9/2001 | Saita et al. | 280/730.2 |
| 6,361,069 B1 | * | 3/2002 | Saito et al. | 280/730.2 |
| 6,364,356 B1 | * | 4/2002 | Keshavaraj | 280/743.1 |
| 6,371,512 B1 | * | 4/2002 | Asano et al. | 280/728.2 |
| 6,382,669 B2 | * | 5/2002 | Tanabe et al. | 280/743.1 |
| 6,386,581 B1 | * | 5/2002 | Ohno | 180/282 |
| 6,431,590 B1 | * | 8/2002 | Bakhsh et al. | 280/729 |
| 6,527,296 B2 | * | 3/2003 | Bakhsh et al. | 280/730.2 |

FOREIGN PATENT DOCUMENTS

| | | |
|---|---|---|
| GB | 2 324 068 | 10/1998 |
| JP | 11-321535 | 11/1999 |

* cited by examiner

Primary Examiner—Lesley D. Morris
Assistant Examiner—Daniel Yeagley
(74) Attorney, Agent, or Firm—Posz & Bethards, PLC

(57) ABSTRACT

An air bag provided with linear joined portions in the inflation section is disclosed. The linear joined portions linearly join the opposing wall portions of the inflation section. Each of the linear joined portions includes a body portion and end portions. The end portions extend from the body portion and gradually become wider than the body portion. The periphery surrounds the end portions and is provided with at least three straight portions. This air bag restrains mesh spreading and inflating gas leakage from the vicinity of any of the end portions of the linear joined portions.

14 Claims, 12 Drawing Sheets

AIR BAG

CROSS REFERENCE TO RELATED APPLICATION

This application claims priority from Japanese Patent Application No. 2000-199393 filed on Jun. 30, 2000, the complete disclosure of which is hereby incorporated herein by reference.

BACKGROUND OF THE INVENTION

1. Field of the Invention

The present invention relates to an air bag that restrains mesh spreading and inflation gas leakage. The air bag may be used in a head-protecting air bag apparatus or a side-impact collision air bag apparatus mountable on a roof side rail part or the seat of an automobile.

2. Description of the Related Art

An air bag for a head-protecting air bag apparatus accommodated in a folded state in the edge portions of the openings of doors or windows in the interior of the vehicle is known in the art. During an inflow of an inflating gas, the air bag expands and inflates to cover the openings. This air bag has an inflation section with a wall portion made of a vehicle-interior-side wall and a vehicle-exterior-side wall. Inflation of the inflation section separates the vehicle-interior-side wall and the vehicle-exterior-side wall from each other by an air cushion.

In addition, plural linear joined portions are disposed in the area of the inflating section. The linear joined portions are formed to linearly join the opposed portions of the wall portion that constitutes the inflation section as shown in Japanese Patent Laid-Open No. 321535/1999. Such linear joined portions are disposed so that the peripheral and central portions of the inflating section have approximately the same thickness. The linear joined portions are disposed so that forward and rearward tensions are produced in the air bag when inflated. When forward and rearward stresses are produced in the air bag, the air bag does not move into the exterior of the vehicle even if the air bag receives a pressure which acts toward the exterior of the vehicle.

If the area of each of the end portions of the linear joined portions is small, stress concentration easily occurs in each of the end portions during the inflation of the inflating section. As a result, the wall portion which constitutes the inflating section is damaged in the vicinity of any of the end portions. To cope with this problem, wider end portions are used in the linear joined portions as shown, for example, in British Patent Laid-Open No. GB 2324068.

However, even when wider end portions are used, there are some cases where inflating gas leakage still occurs. Specifically, if the wall portion that constitutes the inflating section is strongly pulled during the inflation of the inflating section, mesh spreading occurs in the wall portion. Then, the inflating gas leaks from the spread meshes.

SUMMARY OF THE INVENTION

An aspect of this invention is to provide an air bag that can restrain the leakage of inflating gas from the vicinity of any of the end portions of the linear joined portions by reducing mesh spreading.

The air bag according to the invention is provided with an inflating section and linear joined portions. The inflation section, when receiving an inflow of an inflating gas, is inflated with opposing portions of its wall portion being spaced apart from each other. The linear joined portions are disposed in the inflation section and are formed to linearly join the opposing portions of the wall portion in the inflation section. Each of the linear joined portions includes a body portion and end portions. The end portions are disposed at each end of the body portion. The end portions gradually become wider than the body portion. A periphery surrounds each of the end portions and the periphery is provided with at least three straight portions that surround the end portions.

During inflation of the air bag, each of the end portions of the linear joined portions is surrounded by swollen portions that isolate opposed walls from each other near each of the end portions. Accordingly, the swollen portions are respectively disposed adjacent to the straight portions of the periphery of each of the end portions in such a manner as to be brought into linear contact with each of the end portions along wide straight lines. The swollen portions are not disposed to come into partial contact with the straight portions. Accordingly, in the air bag according to the invention, stress concentration does not easily occur in the boundary portion between any of the end portions and the swollen portions, and spreading of the meshes of yarns that weave the air bag is prevented. This, in turn prevents inflating gas from leaking from the boundary portion between any of the end portions and the swollen portions.

In addition, if the number of the straight portions that constitute each periphery of the end portions is at least three, approximately the entire area of each periphery of the respective end portions can be formed of straight portions, except the body portions. Accordingly, it is possible to restrain the leakage of inflating gas from the vicinity of any of the end portions of the linear joined portions.

Since each of the straight portions is disposed in parallel with yarns that weave the air bag, it is possible to obtain the following effects and advantages. Specifically, even if the wall portion is strongly pulled at the swollen portions located adjacent to the respective straight portions, the forces exerted by the pulling are approximately parallel or perpendicular to the yarns. Since the pulling directions during inflation differ from the bias directions of the yarns, it is possible to prevent mesh spreading to a further extent.

BRIEF DESCRIPTION OF THE DRAWINGS

The invention will become more readily appreciated and understood from the following detailed description of the invention when taken in conjunction with the accompanying drawings, in which.

DETAILED DESCRIPTION OF PREFERRED EMBODIMENTS

The invention will be described below on the basis of preferred embodiments shown in the accompanying drawings. However, the invention is not limited to the preferred embodiments. All variations in the appended claims or equivalents relative thereto are intended to be encompassed in the scope of the claims.

Figure 1:
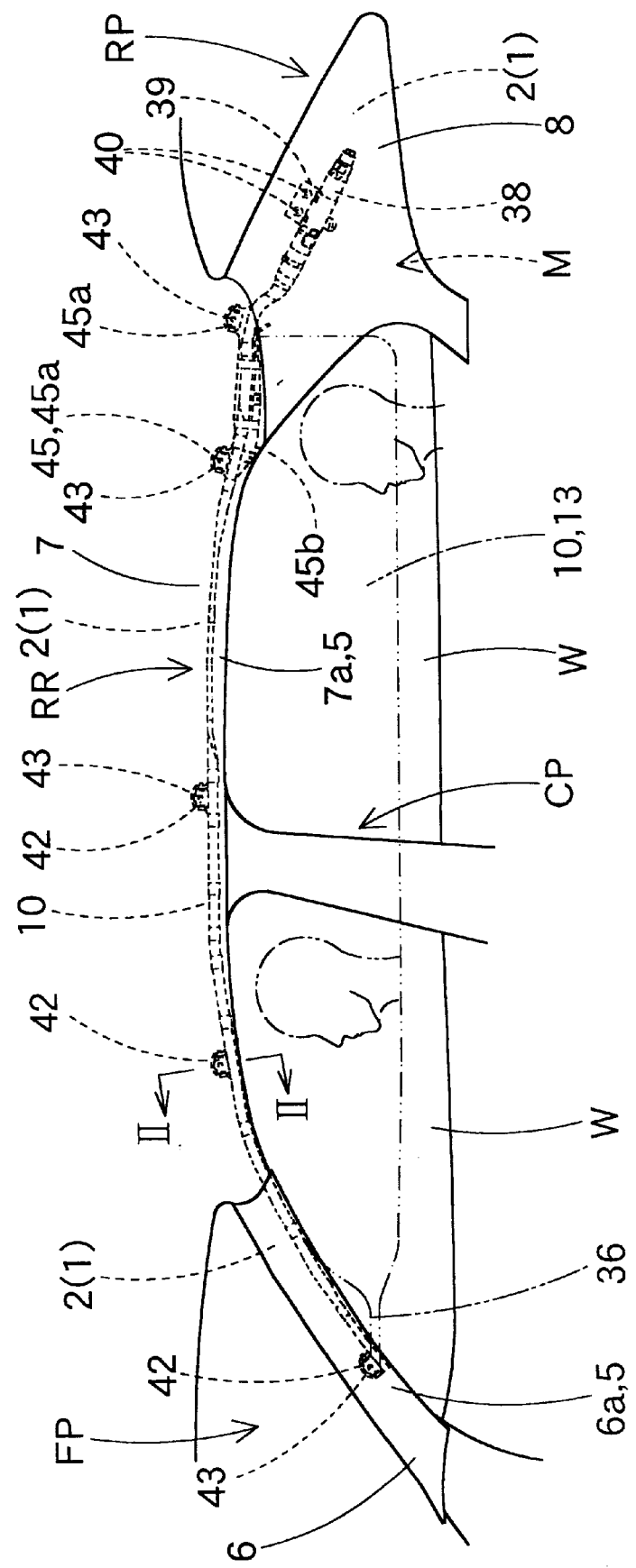
FIG. 1 is a side schematic view showing the manner of use of a head-protecting air bag apparatus which uses an air bag according to one embodiment of the invention.
Figure 2:
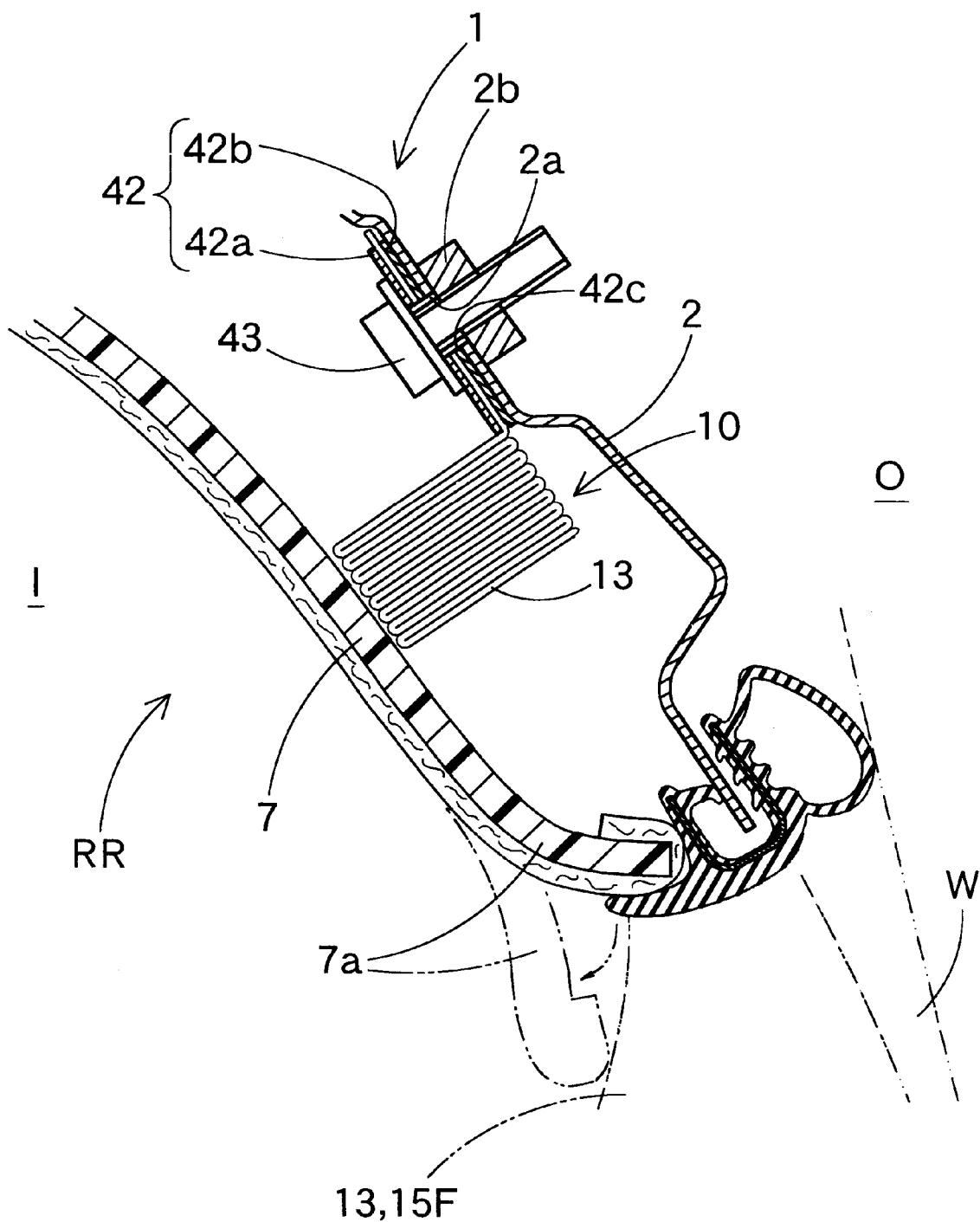
FIG. 2 is an enlarged partial longitudinal sectional view of portion II—II of FIG. 1.

An air bag 10 according to this invention is suitable for use in the head-protecting air bag apparatus M shown in FIGS. 1 and 2. The head-protecting air bag apparatus M is provided with the air bag 10, an inflater 38, mounting brackets 39, 42 and 45 and an air bag cover 5. This air bag 10 is preferably accommodated in a folded state at the top edges of openings W for doors or windows in the inside of a vehicle. Specifically, the air bag 10 is accommodated in a folded state in a front pillar section FP, a roof side rail section RR and a rear pillar section RP.

As shown in FIG. 1, the inflater 38 is preferably of a cylinder type and supplies an inflating gas to the folded air bag 10. A gas inlet section 12 of the air bag 10 is fitted on the inflater 38.

The mounting bracket 39 is made of sheet metal. The gas inlet section 12 of the air bag 10 is fitted and clamped around the periphery of inflater 38 by mounting bracket 39. Mounting bracket 39 is mounted on the rear pillar section RP on the same side as a body 1 by using two mounting bolts 40. Specifically, the mounting bracket 39 is mounted on a sheet-metal-made inner panel 2 on the same side as body 1 on the vehicle-interior side of the rear pillar section RP.

As shown in FIGS. 1 and 2, the mounting brackets 42 are made of sheet metal, and clamp two front mounting portions 11 of the air bag 10 and the leading end of a belt section 36. Each of the mounting brackets 42 is provided with an inner plate 42a disposed on the same side as a vehicle interior I and an outer plate 42b disposed on the same side as a vehicle exterior O. A mounting hole 42c which corresponds to a mounting hole 11a of one of the mounting portions 11 or a mounting hole 36a of the belt section 36 (refer to FIG. 3) is formed to extend through each of the inner and outer plates 42a and 42b. The respective mounting bolts 43 are inserted through the mounting hole 42c, 11a and 36a and are screwed into nuts 2b. Also, the respective nuts 2b are fixed to the edge portions of mounting holes 2a of the inner panel 2.

Figure 3:
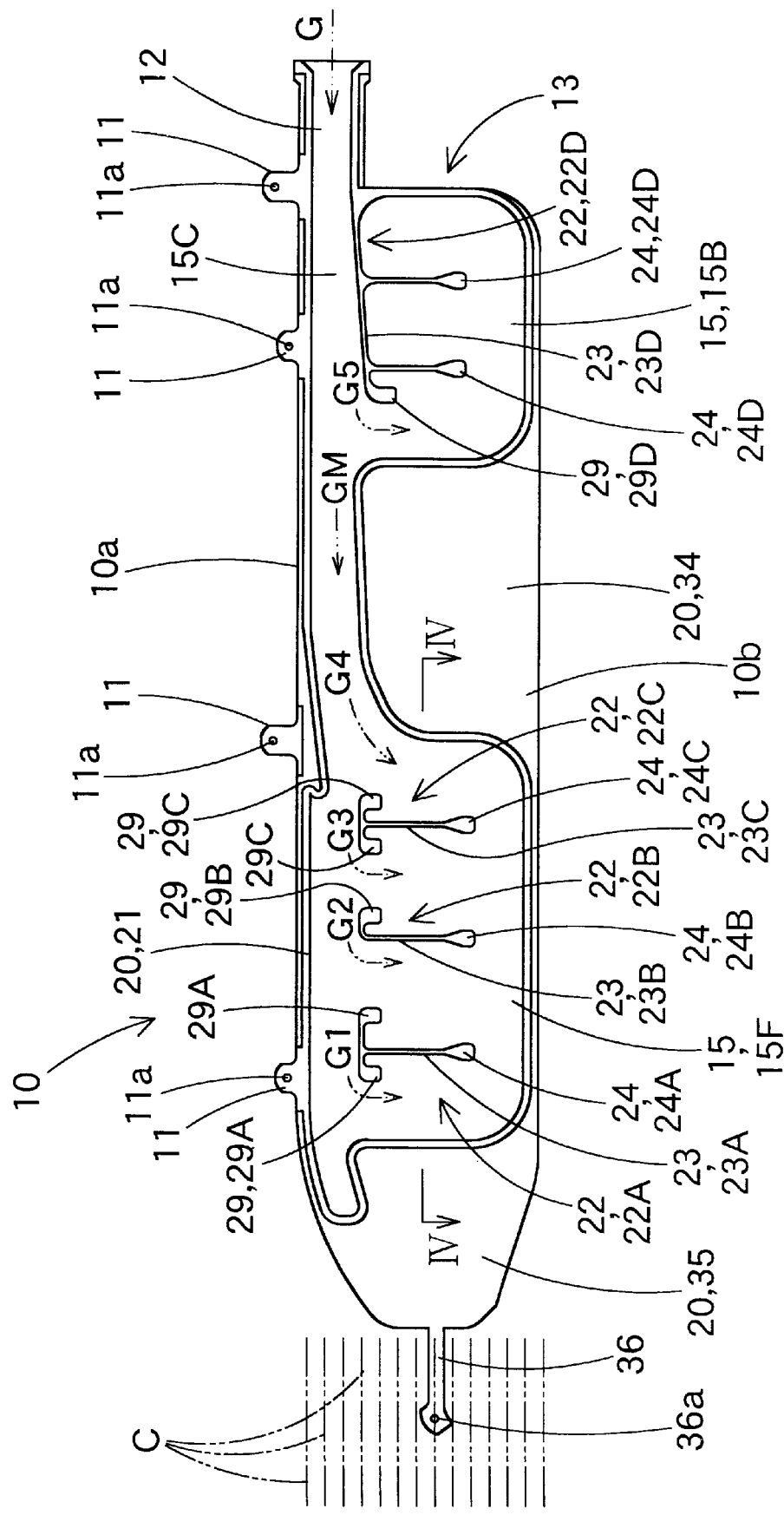
FIG. 3 is a front view showing an inflated air bag.
Figure 4:
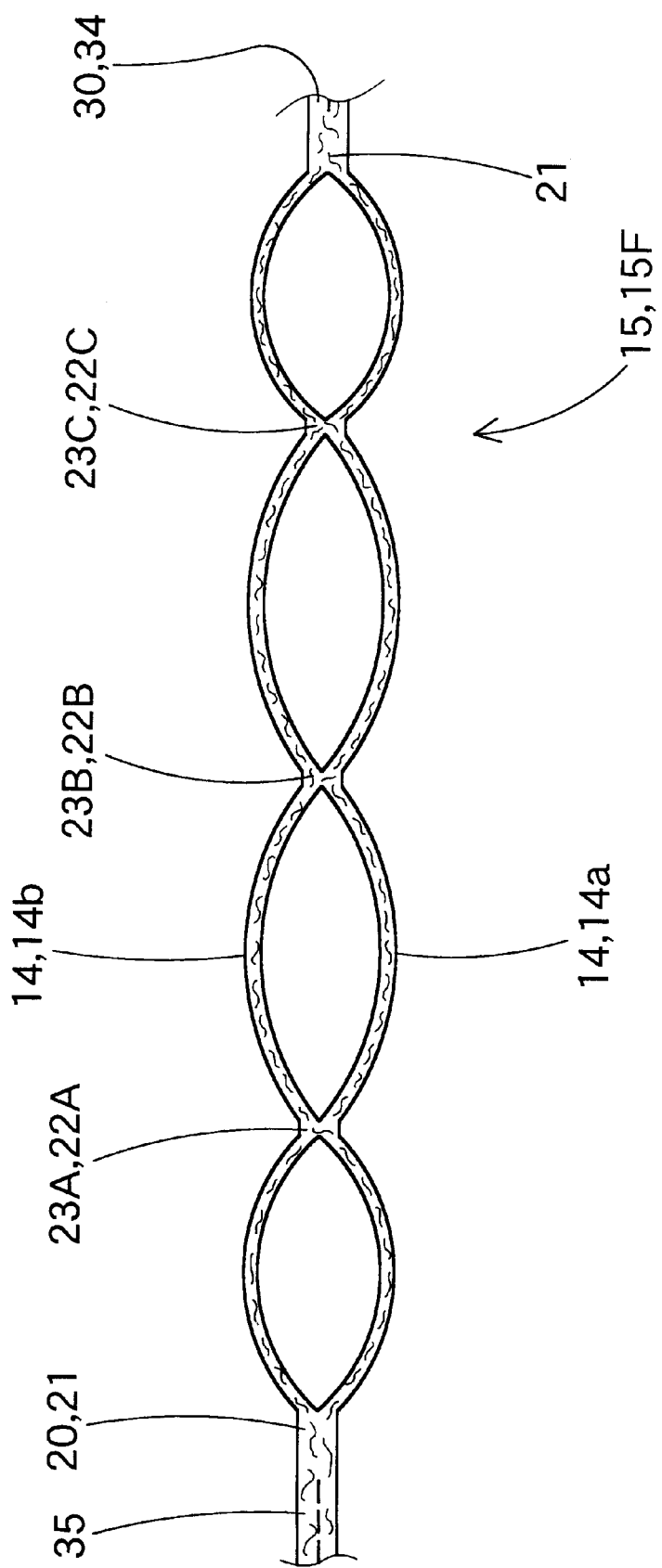
FIG. 4 is an enlarged cross-sectional view taken along line IV–IV of FIG. 3.

As shown in FIGS. 1 and 3, mounting bracket 45 is made of sheet metal and clamps two rear mounting portions 11 of air bag 10. This mounting bracket 45 is provided with two inner plates 45a and one outer plate 45b. Each of the inner plates 45a is similar to inner plate 42a of each of the mounting brackets 42 and is disposed on the same side as the vehicle interior I. The outer plate 45b is disposed on the vehicle-exterior side of each of the inner plates 45a and preferably has a form in which the outer plates 42b of the respective mounting brackets 42 are integrated into one plate. The outer plate 45b has an approximately L-like cross-sectional shape and supports the vehicle-exterior side as well as the bottom side of the folded air bag 10. The outer plate 45b prevents the air bag 10 from projecting into the vehicle-exterior side of garnish 8 of the rear pillar section RP during expansion and inflation of the air bag 10. Mounting holes (not shown) are formed in the inner plates 45a and outer plate 45b at locations corresponding to the mounting holes 11a of the mounting portions 11.

An air bag cover 5 is made of lids 6a and 7a. The lid 6a is disposed on the bottom edge side of a front pillar garnish 6 located on the front pillar section FP. The lid 7a is disposed on the bottom edge side of the roof head lining 7 located on the roof side rail section RR.

The front pillar garnish 6 is made of a synthetic resin and is fixedly mounted on the inner panel 2 on the same side as body 1 on the vehicle-interior side of the front pillar section FP. During expansion and inflation of the air bag 10, the lid 6a disposed on the bottom edge side of the front pillar garnish 6 opens toward the vehicle interior I so as to enable projection of the air bag 10.

As shown in FIGS. 1 and 2, the roof head lining 7 is made of a synthetic resin and is fixedly mounted on the inner panel 2 on the same side as body 1 on the vehicle-interior side 1 of the roof side rail section RR. During expansion and inflation of the air bag 10, the lid 7a on the bottom edge side of the roof head lining 7 opens toward the vehicle interior I so as to enable projection of the air bag 10.

As shown in FIGS. 1 to 4, the air bag 10 is provided with an air bag body 13, gas inlet section 12, mounting portions 11 and belt section 36. The air bag body 13 is charged with an inflating gas from the inflater 38 and is expanded from its folded state to cover openings W. The gas inlet section 12 guides the inflating gas from the inflater 38 to the air bag body 13. The mounting portions 11 are provided on the top edge side 10a of the air bag body 13. The belt section 36 is provided on the front end of the air bag body 13.

The gas inlet section 12 is formed in a tubular shape and is surrounded by a peripheral joined portion 21 located on the top edge side of a communicating inflation section 15C, a linear joined portion 22D and a peripheral joined portion 21 that is located on the bottom edge side of the communicating inflation section 15C and extends rearwardly from the linear joined portion 22D. This gas inlet section 12 is fitted on the inflater 38, as described previously.

The mounting portions 11 are disposed in such a manner that plural mounting portions project upwardly from the peripheral joined portion 21 on the top edge side 10a of the air bag body 13. Any one of mounting brackets 45 and 42 for mounting the air bag body 13 to the inner panel 2 is secured to each of the mounting portions 11. In addition, each of the mounting portions 11 has a mounting hole 11a through which the mounting bolt 43 is inserted.

The belt section 36 is formed in a belt-like shape in such a manner as to project forwardly from a plate-shaped joined portion 35 of the air bag body 13. The leading end of the belt section 36 has a mounting hole 36a through mounting bolt 43 is inserted. The air bag body 13 is provided with an inflation section 15 and a non-inflation section 20. The inflation section 15 communicates with the gas inlet section 12, and is inflated with an inflating gas flowing in through the gas inlet section 12. The non-inflation section 20 does not allow inflow of the inflating gas.

The air bag body 13, together with the mounting portions 11 and the gas inlet section 12, are integrally formed into a hollow weave by using, for example, polyamide yarn or polyester yarn. The vehicle-interior-side wall 14a and vehicle-exterior-side wall 14b of a wall portion 14 of the inflation section 15 are respectively formed of plain weave fabrics. Preferably, each vehicle side wall is made of 49–58 warp yarns and 49–58 weft yarns per square inch. For example, an embodiment of the present invention may have 56 warp yarns and 51 weft yarns per square inch. Each of the mounting portions 11, the peripheral joined portion 21 and linear joined portions 22 (22A, 22B, 22C and 22D) is made of yarns that are twice as large in number per square inch as those of the vehicle-interior-side wall 14a.

After the air bag body 13 has been woven in the form of plain weave, the air bag body 13 is covered with a coating layer of silicone. The coating layer increases the heat resistance of the air bag body 13 and reduces inflating gas leakage. Since the coating material cannot be applied to the inside surface of the air bag body 13 after the completion of weaving, the coating layer is formed on the exterior surface of the air bag body 13.

The inflation section 15 is made of a front-seat inflation section 15F, a rear-seat inflation section 15B and the communicating inflation section 15C. The front-seat inflation section 15F is disposed at a position on the front-seat side of the vehicle. The rear-seat inflation section 15B is disposed at a position on the rear-seat side of the vehicle. The communicating inflation section 15C communicates with the gas inlet section 12 and provides communication between the upper portions of the front-seat inflation section 15F and the rear-seat inflation section 15B. Then, each of the inflation sections 15F, 15B and 15C is surrounded by wall portion 14 having vehicle-interior-side wall 14a and vehicle-exterior-side wall 14b.

The non-inflation section 20 is formed by interconnecting the vehicle-interior-side wall 14a and the vehicle-exterior-side wall 14b. The non-inflation section 20 is made of the peripheral joined portion 21, the linear joined portions 22 (22A, 22B, 22C and 22D), and the plate-shaped joined portions 34 and 35. The peripheral joined portion 21 is disposed to surround the periphery of the inflation section 15.

The plate-shaped joined portion 34 is formed in an approximately rectangular shape under the communicating inflation section 15C between the front- and rear-seat inflation sections 15F and 15B. The plate-shaped joined portion 35 is formed in an approximately triangular shape on the front-end side of the air bag body 13. The plate-shaped joined portions 34 and 35 are set to help define the shape of the air bag body 13 from the gas inlet section 12 to the front portion of the air bag body 13. The plate-shaped joined portions 34 and 35 reduce the volume of the inflation section 15 and shorten the time to complete inflation.

Peripheral joined portion 21 and linear joined portions 22 (22A, 22B, 22C and 22D) are finely woven as compared to the coarsely woven plate-shaped joined portions 34 and 35. The plate-shaped joined portions 34 and 35 form the boundary of the inflation section 15, therefore countermeasures against the leakage of the inflating gas, such as tightness of the weave, are not necessary.

Figure 5:
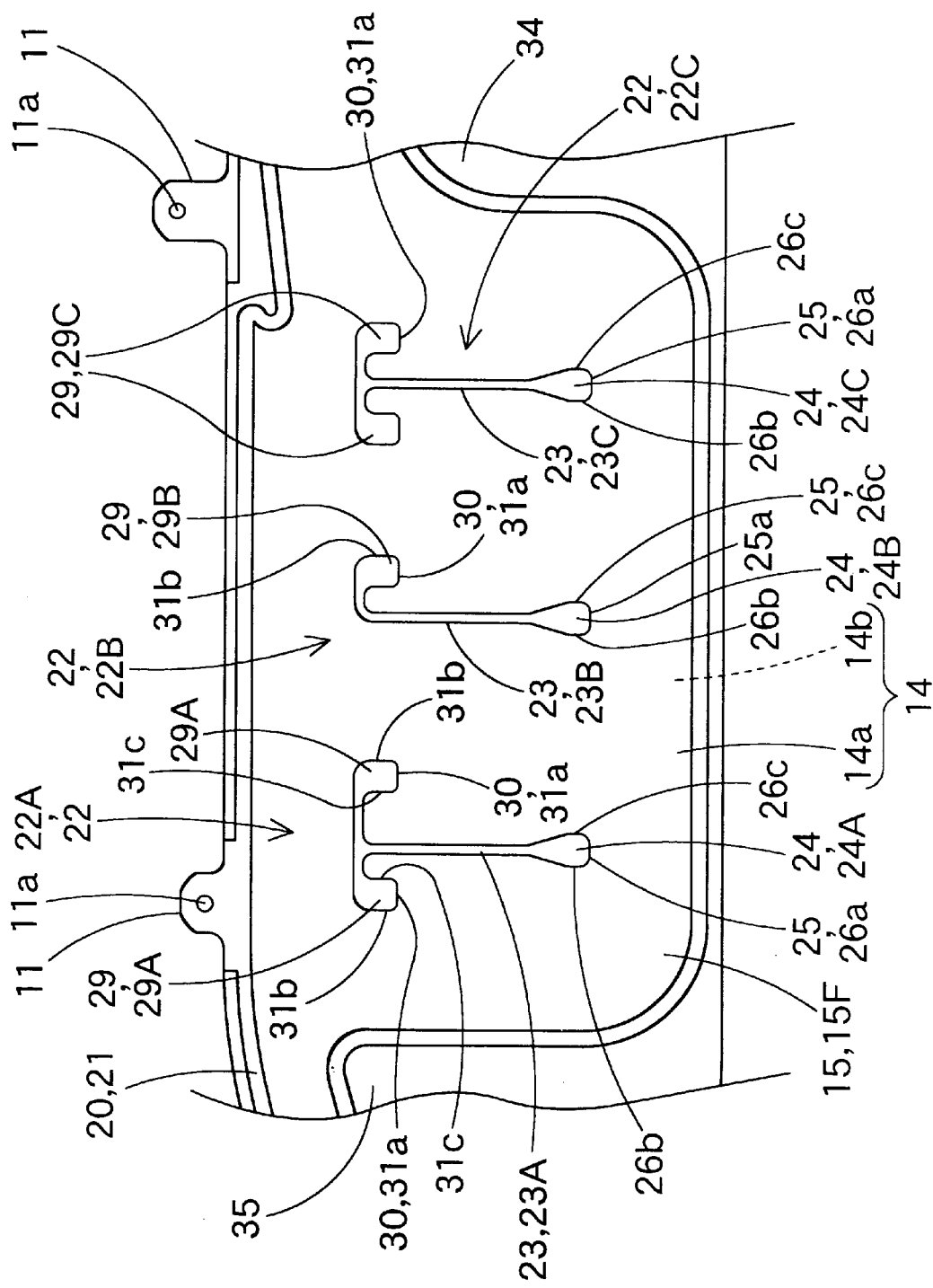
FIG. 5 is an enlarged partial front view of a front-seat inflation section in the air bag.

The linear joined portions 22A, 22B and 22C are disposed away from the peripheral joined portion 21 in the area of the front-seat inflation section 15F. In addition, as shown in FIGS. 3 and 5, the linear joined portions 22A and 22C are disposed on the front and rear side of the front-seat inflation section 15F. Each of the linear joined portions 22A and 22C is provided with a body portion 23 (23A and 23C) and end portions 24 (24A and 24C) and 29 (29A and 29C). The body portion 23 (23A and 23C) has an approximately T-like shape. Each of the end portions 24 (24A and 24C) and 29 (29A and 29C) has an approximately rectangular shape and the end portions 24 (24A and 24C) and 29 (29A and 29C) are respectively disposed at three end sides of body portion 23 (23A and 23C). Linear joined portion 22B is disposed between the linear joined portions 22A and 22C. Linear joined portion 22B is provided with body portion 23 (23B) and end portions 24 (24B) and 29 (29B). The body portion 23 (23B) has an approximately inverted-J-like shape. The respective end portions 24 (24B) and 29 (29B) have approximately rectangular shapes and are disposed on two end sides of the body portion 23 (23B).

The linear joined portion 22D is disposed to extend forward from the peripheral joined portion 21 at the rear top end of the rear-seat inflation section 15B. The linear joined portion 22D partitions the gas inlet section 12 and rear-seat inflation section 15B. Linear joined portion 22D is provided with body portion 23 (23D) and end portions 24 (24D) and 29 (29D). The body portion 23 (23D) has an approximately inverted-F-like shape that penetrates the area of the rear-seat inflation section 15B. The respective end portions 24 (24D) and 29 (29D) have approximately rectangular shapes and are disposed at three end sides of the body portion 23 (23D).

Inflating gas G flows into the gas inlet section 12 as main flow GM. Then it continues to flow forward towards the front of the vehicle via the communicating inflation section 15C and the top portion of the front-seat inflation section 15F. Branch flows G1, G2, G3, G4 and G5, which branch off the main flow GM downward from the space between the peripheral joined portion 21 and linear joined portions 22 (22A, 22B, 22C and 22D), inflate the front-seat inflation section 15F and the rear-seat inflation section 15B.

Figure 6:
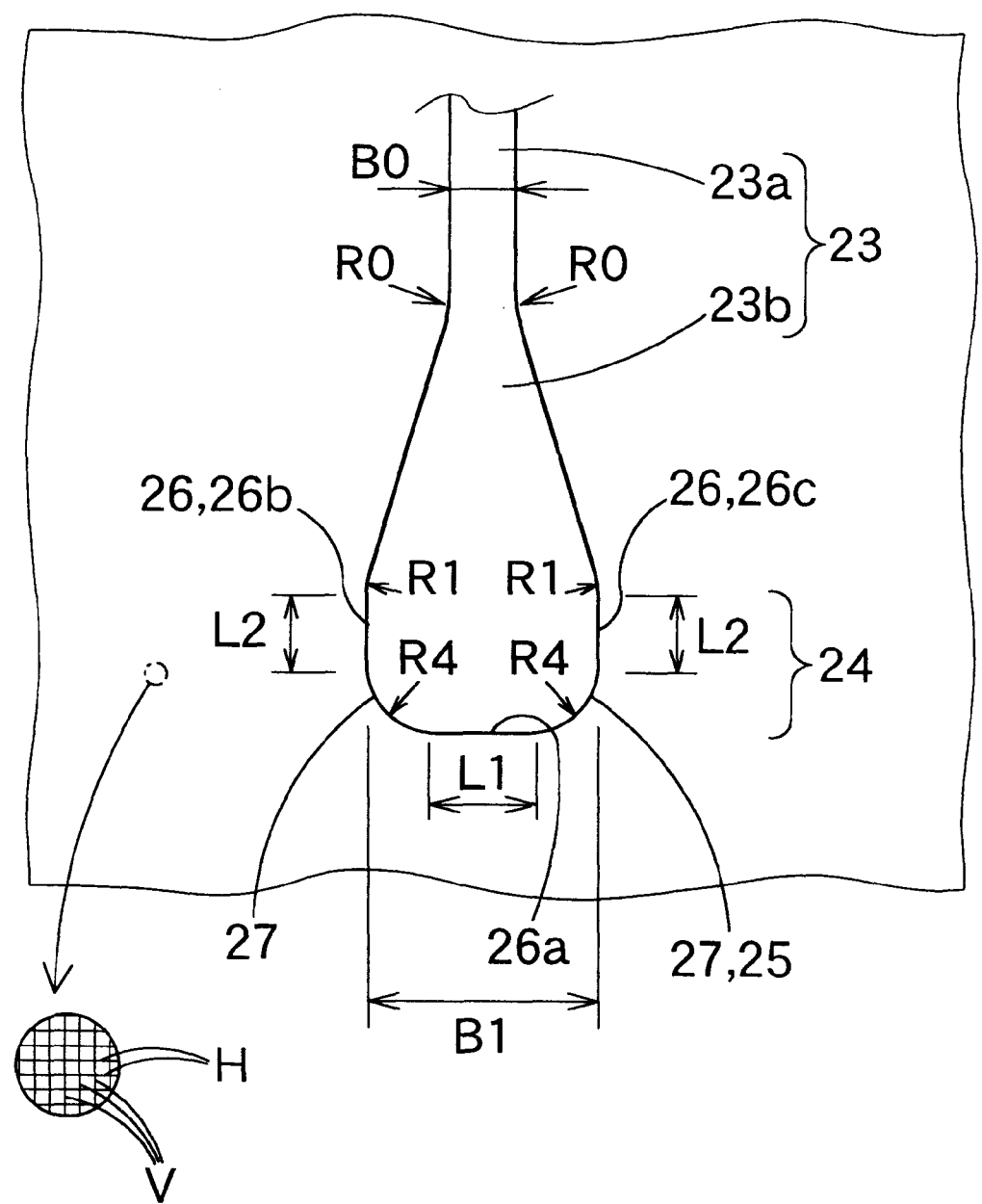
FIG. 6 is an enlarged partial view showing an end portion of a linear joined portion in the air bag.

As shown in FIG. 6, the bottom end portion of the body portion 23 of each of the linear joined portions 22 (22A, 22B, 22C and 22D) is provided with a general portion 23a and a joining portion 23b. The joining portion 23b extends down and flares out from the general portion 23a by gradually becoming wider than the general portion 23a. The bottom end portion 24 of each of the linear joined portions 22 (22A, 22B, 22C and 22D) extends to the joining portion 23b in tapering form. The bottom end portion 24 is wider than the general portion 23a. The periphery 25 of the bottom end portion 24 is basically made of straight portion 26.

FIG. 6 shows that, in this embodiment, straight portion 26 is made of a leading-end-side straight portion 26a and adjacent straight portions 26b and 26c. The leading-end-side straight portion 26a extends toward the front and the rear of the vehicle at the bottom end of the bottom end portion 24. The adjacent straight portions 26b and 26c are disposed to extend in parallel with each other in the vertical direction approximately perpendicular to the leading-end-side straight portion 26a. A curved portion 27 of ¼-arc-like shape connects the leading-end-side straight portion 26a and each of the adjacent straight portions 26b and 26c. The leading-end-side straight portion 26a is parallel with weft yarns H that weave the air bag body 13. In addition, each of the adjacent straight portions 26b and 26c is parallel with warp yarns V that weave the air bag body 13.

Figure 7:
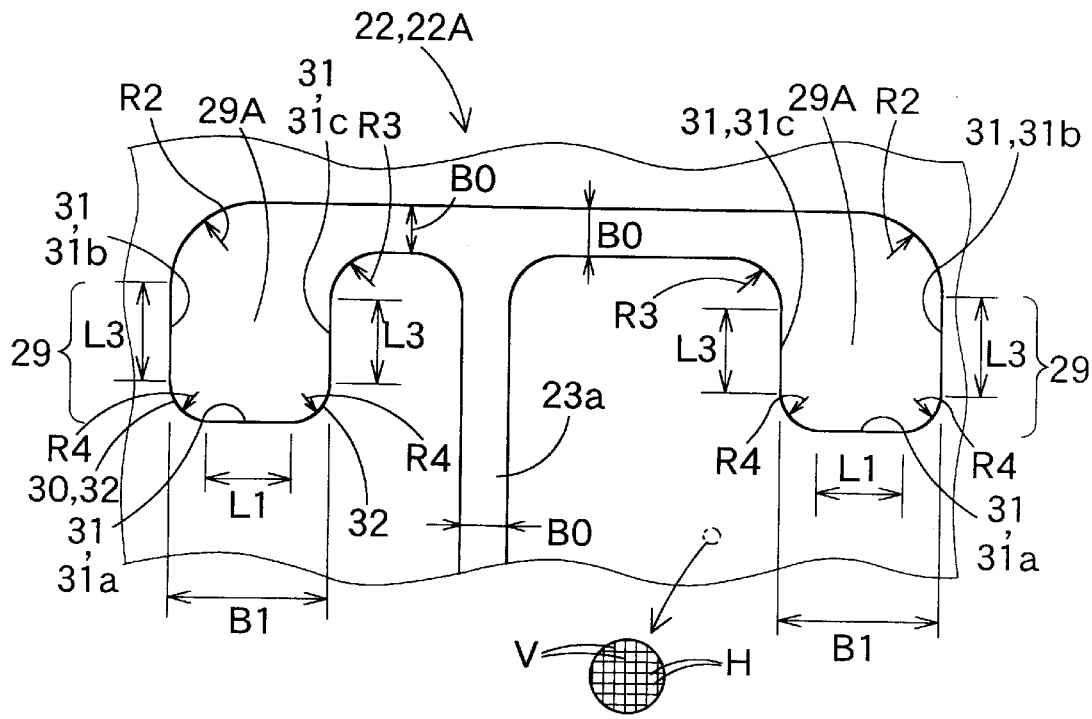
FIG. 7 is an enlarged partial view showing an end portion of another linear joined portion in the air bag.
Figure 8:
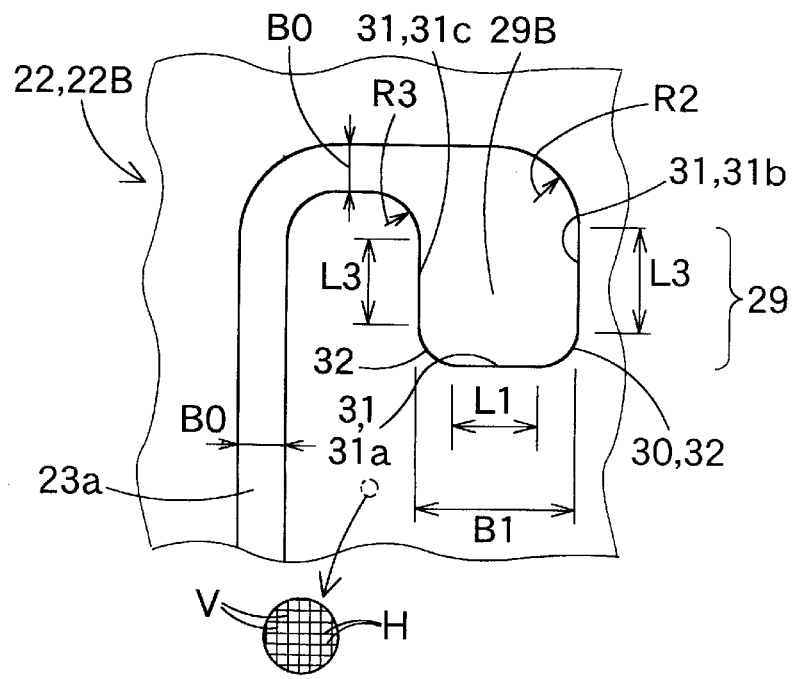
FIG. 8 is an enlarged partial view showing an end portion of yet another linear joined portion in the air bag.

As shown in FIGS. 7 and 8, the top end portion of each of the linear joined portions 22 (22A, 22B, 22C and 22D also shown in FIG. 3) is provided with the general portion 23a of reduced width. The top end portion 29 of each of the linear joined portions 22 (22A, 22B, 22C and 22D) extends downward from the top of general portion 23a and is wider than the general portion 23a. The periphery 30 of each of the top end portions 29 is basically made of straight portion 31.

Specifically, the straight portion 31 is made of a leading-end-side straight portion 31a and adjacent straight portions 31b and 31c. The leading-end-side straight portion 31a extends toward the front and the rear of the vehicle at the bottom end of the top end portion 29 that extends downward from the general portion 23a. The adjacent straight portions 31b and 31c are parallel to each other in the vertical direction and are approximately perpendicular to the leading-end-side straight portion 31a. A curved portion 32 of ¼-arc-like shape connects the leading-end-side straight portion 31a and each of the adjacent straight portions 31b and 31c. The leading-end-side straight portion 31a is parallel with the weft yarns H that weave the air bag body 13. Each of the adjacent straight portions 31b and 31c is parallel with the warp yarns V that weave the air bag body 13.

In this embodiment, for example, a width B0 of the general portion 23a of each of the linear joined portions 22 is 7 mm, and a width B1 of each of the end portions 24 and 29 is about 25 mm. The radius of curvature R0 of the periphery of the joining portion between the general portion 23a and joining portion 23b is about 100 mm. The radius of curvature R1 of the peripheral side of the joining portion between the general portion 23b and each of the adjacent straight portions 26b and 26c is about 100 mm. The radius of curvature R2 of the joining portion between the general portion 23a and adjacent straight portion 31b is about 15 mm. The radius of curvature R3 of the joining portion between the general portion 23a and adjacent straight portion 31c is about 8 mm. In addition, the length L1 of each of the leading-end-side straight portions 26a and 31a is about 6 mm, and length L2 of each of the adjacent straight portions 26b and 26c is about 6 mm. The length L3 of each of the adjacent straight portions 31b and 31c is about 11 to 13 mm. The radius of curvature R4 of each of the curved portions 27 and 32 is about 8 mm.

These linear joined portions 22 (22A, 22B, 22C and 22D) are strategically placed in the front-seat inflation section 15F and the rear-seat inflation section 15B. During inflation of the air bag 10, the linear joined portions permit essentially simultaneous and uniform inflation of the front-seat inflation section 15F and the rear-seat inflation section 15B. In addition, the linear joined portions 22 (22A, 22B, 22C and 22D) produce a tension in the area from the vicinity of the leading end of the gas inlet section 12 to the front portion of the air bag body 13 when the inflation section 15 is inflated by the inflow of the inflating gas. Even if the air bag body 13 receives a pressure that acts toward the exterior of the vehicle, the air bag body 13 does not move into the exterior of the vehicle when the tension is produced in the air bag body 13.

The mounting of the air bag 10 in the vehicle will be described below. First of all, the air bag 10 is hollow-woven and cut into a predetermined shape, and the mounting holes 11a and the like are provided on the air bag 10. Then, after a coating layer has been appropriately provided on the air bag 10, the air bag 10 is folded by a folding machine. This folded state has a bellows-like form in which the air bag 10 is folded along folding lines C for crest folding and root folding as shown by dot-dot-dashed lines in FIG. 3. It is folded in such a manner that the bottom edge side 10b of the air bag 10 is located close to the top edge side 10a of the air bag 10.

After folding, the air bag 10 is wrapped with tape, which can easily be broken by pressure from the inflating gas, to prevent the folded air bag 10 from getting out of shape. The inflater 38 and the mounting brackets 39, 42 and 45 are mounted to form an air bag assembly. Also, the tape is further wrapped around the portion of the mounting bracket 45 to prevent the air bag 10 and the mounting bracket 45 from separating from each other. Of course, the present invention may be practiced with or without the tape.

Each of the mounting brackets 39, 42 and 45 is disposed at a predetermined location on the inner panel 2. Mounting brackets 39, 42 and 45 are secured to the inner panel 2 by inserting bolts 40 and 43 through the respective mounting holes 11 or the like thereby mounting the air bag assembly on the body 1. Then, the front pillar garnish 6, the roof head lining 7, the rear pillar garnish 8, and center pillar garnish 9 of center pillar section CP are mounted on the body 1. This permits mounting of the air bag 10 on the vehicle together with the head-protecting air bag apparatus M.

When the inflater 38 is operated after the head-protecting air bag apparatus M is installed, the inflating gas G from the inflater 38 flows into the communicating inflation section 15C of the inflation section 15 through gas inlet section 12. Then, the main flow GM of the inflating gas G is branched into the branch flows G1, G2, G3, G4 and G5. The branch flows G1, G2, G3 and G4 flow into the front-seat inflation section 15F, while the branch flow G5 flows into the rear-seat inflation section 15B. At this point, the inflation section 15 of the air bag 10 starts inflating while being gradually unfolded. Then, the air bag 10 breaks the wrapping tape and forces open lid 6a of the front pillar garnish 6 and lid 7a of the roof head lining 7. The air bag 10 inflates to such a great extent that the air bag 10 covers the openings W as shown by dot-dot-dashed lines in FIGS. 1 and 2.

Figure 9:
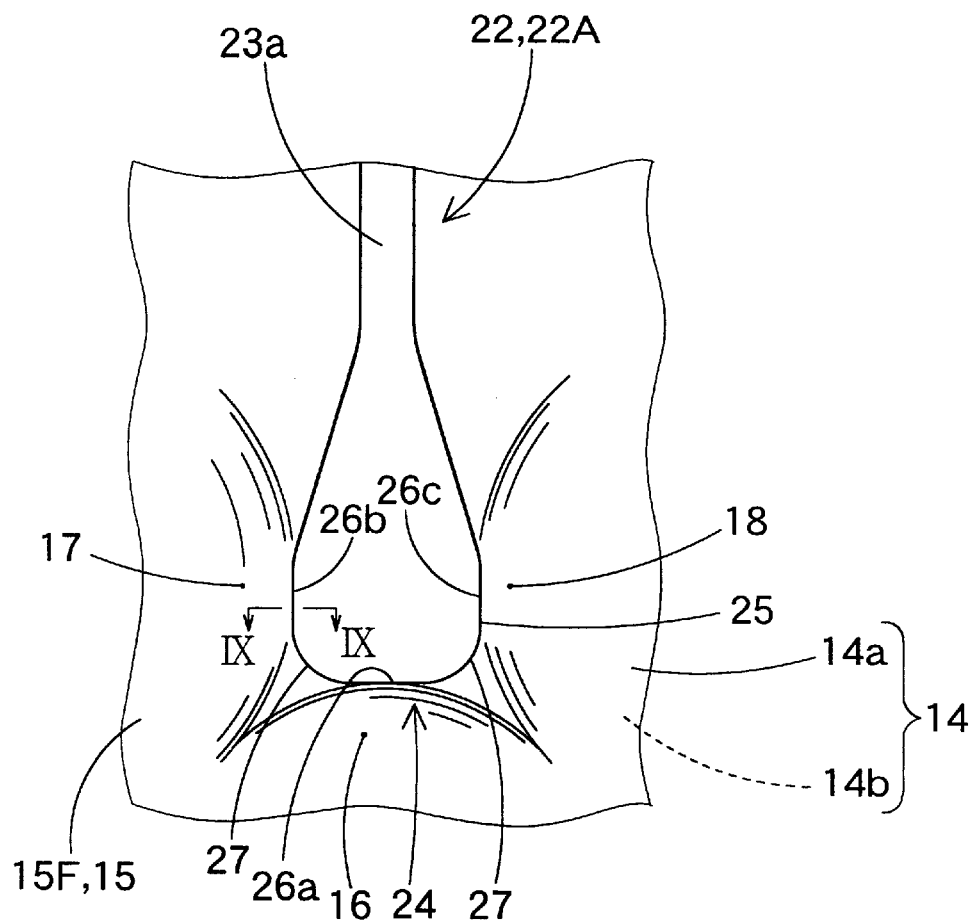
FIG. 9 is an enlarged partial view showing the swollen portions adjacent to the end portion shown in FIG. 6.
Figure 9A:
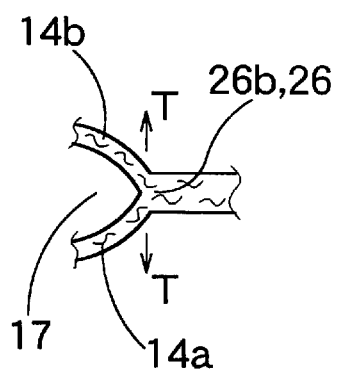
FIG. 9A is a cross sectional view taken along line IX—IX of FIG. 9.
Figure 10:
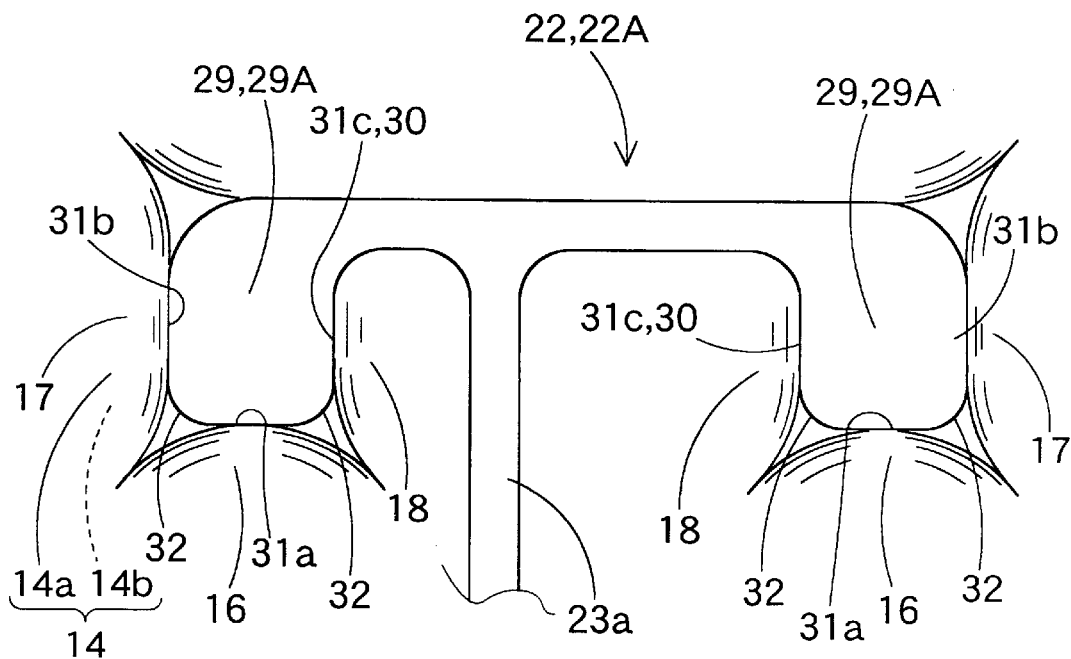
FIG. 10 is a view showing the swollen portions adjacent to the end portion shown in FIG. 7.
Figure 11:
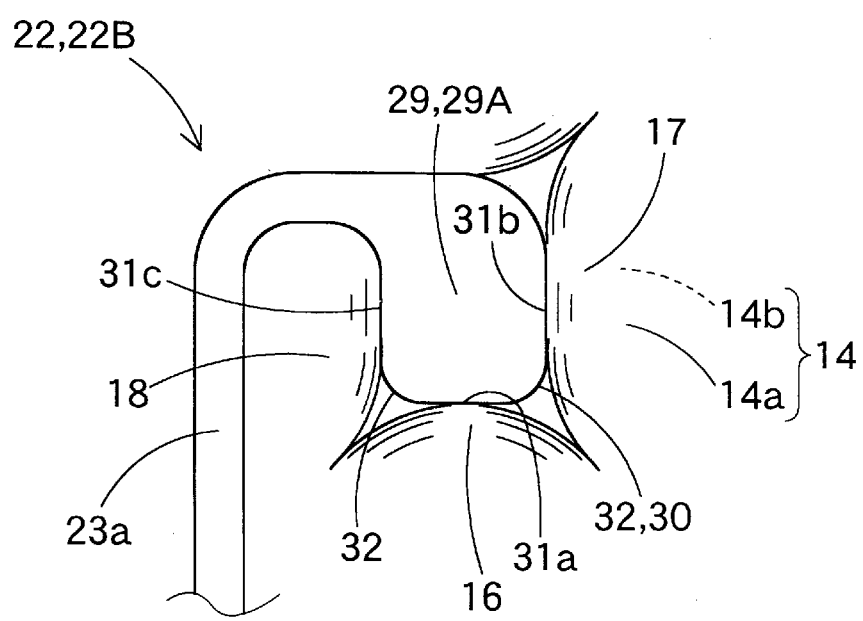
FIG. 11 is a view showing the swollen portions adjacent to the end portion shown in FIG. 8.

In the air bag 10 shown in FIGS. 9 to 11, each of the bottom end portions 24 and 29 of each of the linear joined portions 22 is surrounded by swollen portions 16, 17 and 18. The swollen portions 16, 17 and 18 are formed in such a manner that the opposing vehicle-interior-side wall 14a and the vehicle-exterior-side wall 14b of the wall portion 14 are separated from each other at the end portions 24 and 29. Accordingly, the respective swollen portions 16, 17 and 18 are disposed adjacent to straight portions 26a, 26b and 26c of periphery 25 of each of the bottom end portions 24 or straight portions 31a, 31b and 31c of periphery 30 of each of the top end portions 29. With this arrangement, the swollen portions 16, 17 and 18 come into linear contact with the respective straight portions 26a, 26b and 26c or 31a, 31b and 31c.

Specifically, the respective swollen portions 16, 17 and 18 are disposed to come into linear contact with straight portions 26a, 26b and 26c of each bottom end portions 24 or straight portions 31a, 31b and 31c of each top end portions 29. But the respective swollen portions 16, 17 and 18 are not disposed to come into partial contact with straight portions 26a, 26b and 26c of each bottom end portions 24 or straight portions 31a, 31b and 31c of each top end portions 29. Accordingly, stress concentration does not easily occur at the periphery 25 and 30 of the respective end portions 24 and 29. This makes it possible to suppress mesh spreading of yarns V and H that weave the air bag body 13. Accordingly, it is possible to prevent the inflating gas G from leaking from the boundary portion between the swollen portions 16, 17 and 18 and any of the end portions 24 and 29.

Accordingly, the air bag 10 of the embodiment can restrain the inflating gas G from leaking from the vicinity of each of the end portions 24 and 29 of each of the linear joined portions 22. Since the linear joined portions 22 have a variable width, they can be disposed in such a manner as to restrain as completely as possible decreases in the volume and inflation area of the inflation section 15.

In this embodiment, each of the straight portions 26a, 26b, 26c, 31a, 31b and 31c is disposed in parallel with the warp yarns V or the weft yarns H that weave the air bag body 13. Accordingly, swollen portions 16, 17 and 18 are inflated adjacent to the respective straight portions 26a, 26b and 26c or 31a, 31b and 31c, even if the wall portion 14 is strongly pulled. The pulling directions of tensile forces T (refer to FIG. 9) differ from bias directions and coincide with directions approximately parallel or perpendicular to the yarns V and H over the entire areas of the straight portions 26a, 26b and 26c or 31a, 31b and 31c. Accordingly, in the embodiment, it is possible to prevent further mesh spreading and inflating gas G leakage from the boundary portions between the swollen portions 16, 17 and 18 of the end portions 24 and 29.

Also, the periphery 25 and 30 of all the end portions 24 and 29 of the linear joined portions 22 are made of the predetermined straight portion 26 and straight portion 31, respectively. However, in each of the linear joined portions 22 the periphery of at least one end portion may be formed to be surrounded by a predetermined straight portion.

Figure 12:
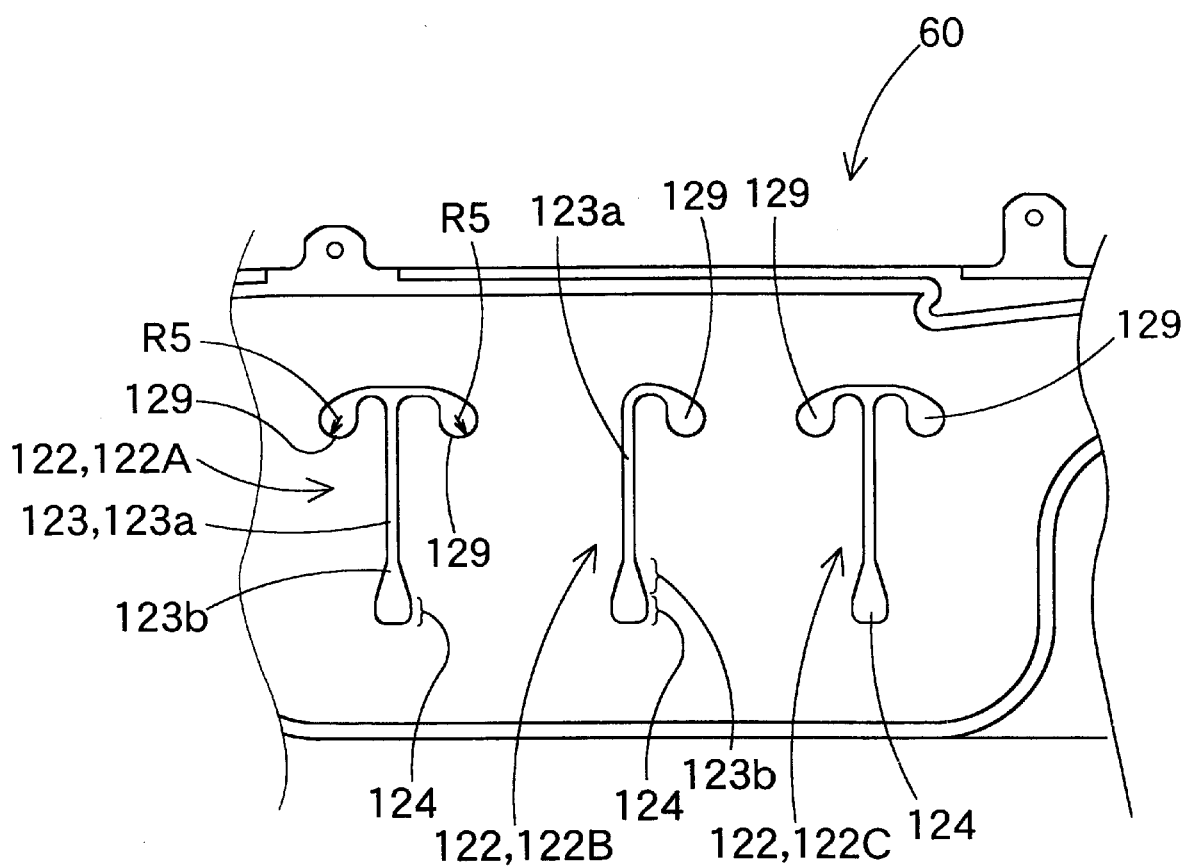
FIG. 12 is an enlarged partial front view of a modified front-seat inflation section in an air bag.
Figure 13:
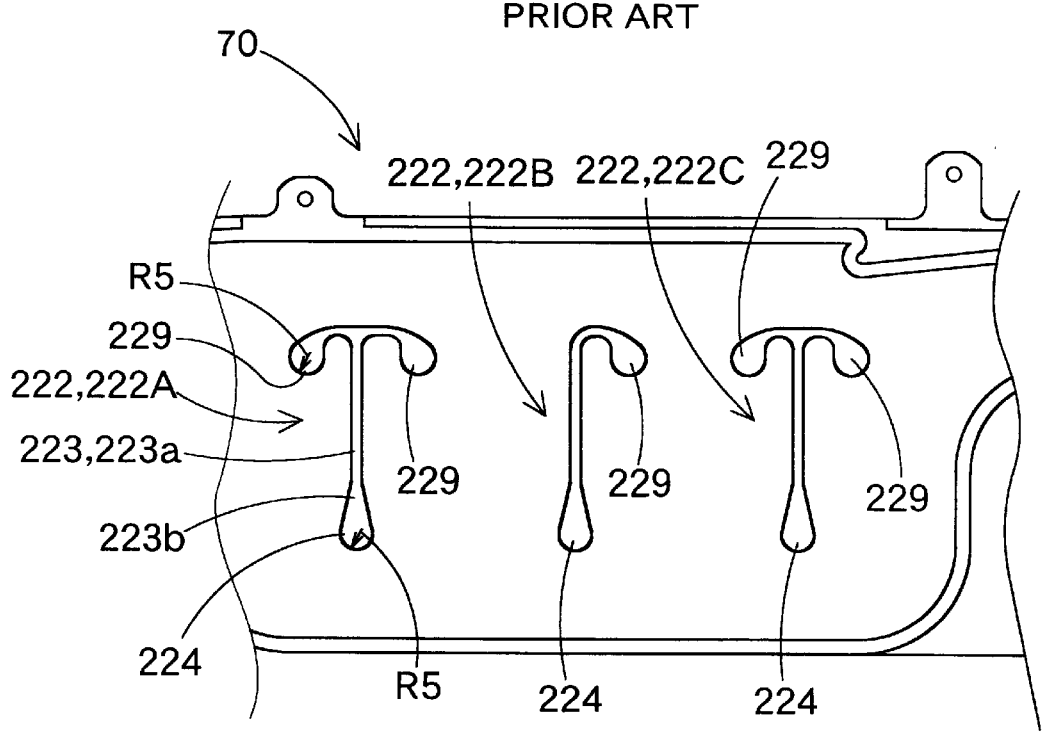
FIG. 13 is an enlarged partial front view of a front-seat inflation section in an air bag of a comparative example.
Figure 14:
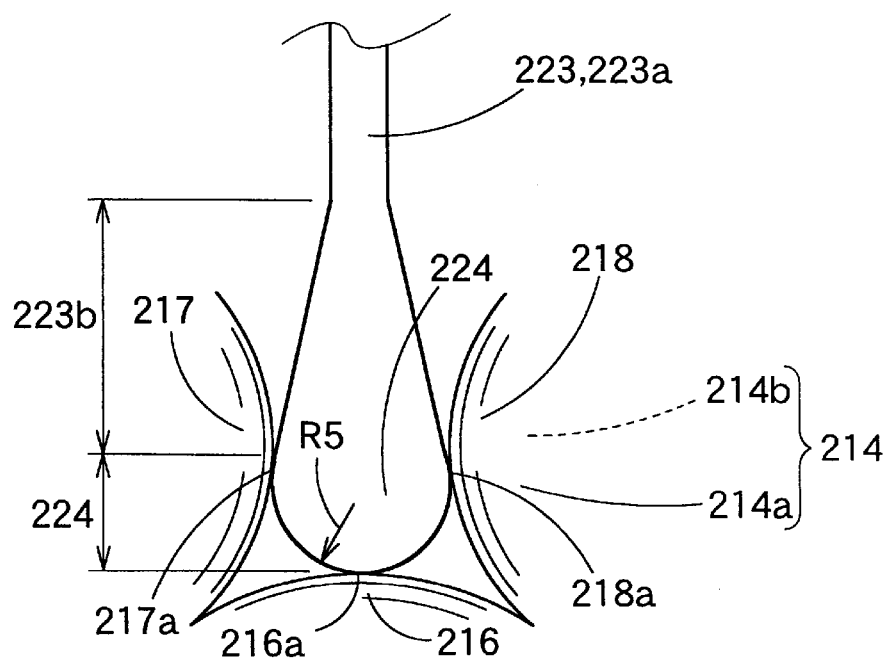
FIG. 14 is an enlarged partial view which clarifies swollen portions near an end portion of the comparative example.

The air bag 10 of the present invention, as shown below, exhibits superior mesh spreading suppression. FIGS. 13 and 14 depict a comparative example. Air bag 70, of the comparative example, has linear joined portions 222 with end portions 224 and 229 respectively having a periphery 225 and 230. The end portions 224 and 229 have an arcuate shape with a radius of curvature R5 of about 12.5 mm. FIG. 12 depicts a modified air bag 60 that is similar to, but different from, the embodiment shown in FIG. 3. In air bag 60 of the modification, the periphery 130 of each of the top end portions 129 of the linear joined portions 122 has an arcuated shape with a radius of curvature R of about 12.5 mm (as in the comparative example), while the bottom end portions 124 of the linear joined portions 122 is formed in a manner similar to that described above in connection with the present invention. In each of the air bags 10, 60 and 70, the vehicle-interior-side wall 14a, 114a and 214a, and vehicle-exterior-side wall 14b, 114b and 214b was formed of a plain weave fabric made of 56 warp yarns and 51 weft yarns per square inch (in the embodiment, the number of yarns in each of the mounting portions 11, the peripheral joined portion 21 and the linear joined portions 22 was twice as large as that in the vehicle-interior-side wall 14a). In addition, in each of the air bags 10, 60 and 70, the vehicle-interior-side wall 14a, 114a and 214a, and the vehicle-exterior-side wall 14b, 114b and 214b were each coated with 120 g/cm² of coating material such as silicone. In other words, each of the air bags 10, 60 and 70 was fabricated in a similar manner except for the dimensions of end portions 24 and 29, 124 and 129, and 224 and 229.

The respective inner pressures of each air bag were measured three seconds after inflation started. The measurement results were 7 kPa for air bag 70 of the comparative example, 30 kPa for the air bag 60 of the modification of the first embodiment and 70 kPa for the air bag 10 of the first embodiment. In other words, it is seen that air bag 10 and 60 were not able to restrain the leakage of inflating gas. In the air bag 70 of the comparative example, as shown in FIG. 14, the respective swollen portions 216, 217 and 218 were disposed to come into contact with each of the end portions 224 and 229 at points 216a, 217a and 218a. In other words, the swollen portions 216, 217 and 218 are disposed to come into partial contact with each of the end portions 224 and 229. Accordingly, it is inferred that stress concentration easily occurs at the boundary between each of the end portions 224 and 229 and the swollen portions 216, 217 and 218 in the air bag 70 of the comparative example. Thus, the meshes of the yarns V and H that weave the air bag body 213 are spread at such boundaries resulting in the mesh spreading and inflation gas leakage.

The results from the measurements of the modification and the present invention were similar even when the radius of curvature R4 of each of the curved portions 27 and 32 was set to 5 mm instead of 8 mm as in the embodiment. Curved portion 27 interconnects straight portions 26a, 26b and 26c of each of the end portions 24 whose peripheries are made of the straight portions 26. Curved portion 32 interconnects straight portions 31a, 31b and 31c of each of the end portions 29 whose peripheries are made of the straight portions 31. It is desirable that the radius of curvature R4 be in the range of about 3–10 mm. If the radius of curvature R4 is less than 3 mm, there is a risk of gas leakage at or near the curved portions 27 or 32 when the air bag 10 is inflated. If the radius of curvature R4 exceeds 10 mm, the width B1 of each of the end portions 24 and 29 becomes excessively large and reduces the volume of the inflation section 15.

In addition, the leakage of the inflating gas is minimized if approximately 3 mm or more can be ensured under predetermined conditions, with respect to each of the lengths L1 and L2 of the straight portions 26a, 26b and 26c which constitute the periphery 25 of each of the end portions 24, as well as each of the lengths L1 and L3 of the straight portions 31a, 31b and 31c which constitute the periphery 30 of each of the end portions 29. Such predetermined conditions are that each of the end portions 24 and 29 is connected to the body portion 23 in such a manner as to become gradually wider from the body portion 23 so that stress concentration does not occur in the periphery 25 or 30, and that the straight portions 26a, 26b and 26c and the straight portions 31a, 31b and 31c are interconnected by the arcuated curved portions, respectively. Also, the width B1 of each of the end portions 24 and 29 should be about 20 mm or more.

Figure 15:
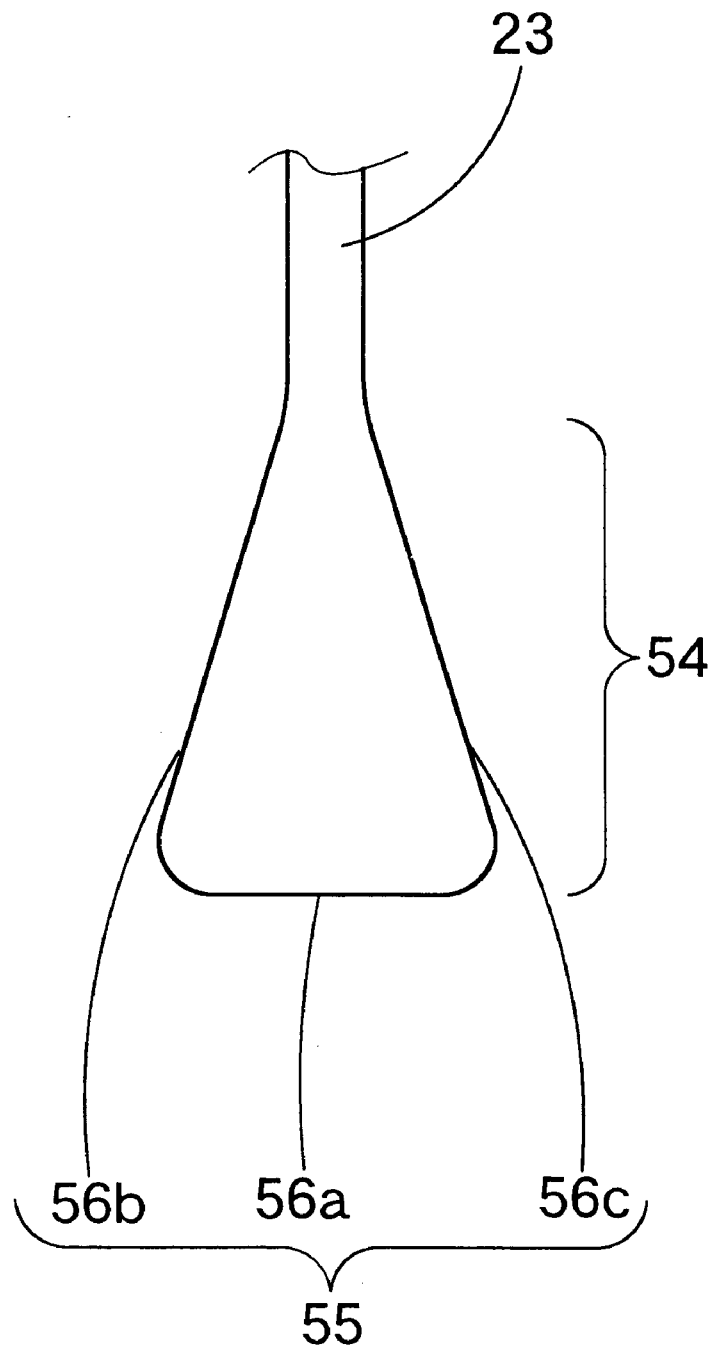
FIG. 15 is a view showing another example of the end portion of the invention.

Furthermore, if the number of straight portions which constitute each periphery 25 and 30 of the respective end portions 24 and 29 is at least three, the entire areas of each periphery 25 and 30 can be formed of straight portions, except the body portions 23. Accordingly, the number of straight portions which constitute each periphery 25 and 30 of the respective end portions 24 and 29 may be made four or more if each of the straight portions is 3 mm long or more. Otherwise, as shown in FIG. 15, an end portion 54 may be adopted. This end portion 54 has the shape of an isosceles triangle, and is made of a peripheral side having three straight portions 56a, 56b and 56c.

The air bag 10 of the embodiment is fabricated by hollow-weaving by way of illustration. However, the air bag may also be fabricated by sewing, using an adhesive or welding using a high-frequency welder. In any of the cases, the invention may also be applied to linear joined portions.

The present invention is described for use in a head-protecting air bag apparatus M. However, the invention can also be applied to an air bag of any type in which linear joined portions are disposed so that the thicknesses of swollen portions can be made approximately equal over the entire area of the air bag or the swollen portions can be partitioned. Accordingly, the invention can also be applied to an air bag in a side-impact collision air bag apparatus mounted on a seat.

The invention is not limited to the embodiments set forth herein above. Various other modifications and embodiments are possible without departing form the spirit of the invention, such as defined by the following claims.

What is claimed is:

1. An air bag comprising:
   an inflation section having opposing wall portions that become spaced apart from each other during inflation by an inflating gas; and
   linear joined portions disposed in the inflation section that linearly join the opposing wall portions, each of the linear joined portions comprising a body portion and at least one end portion, wherein;
      an outer periphery of the at least one end portion is connected to an outer periphery of the body portion;
      the at least one end portion is wider than the body portion;
      the outer periphery of the at least one end portion is defined by at least three straight portions and connecting portions, wherein the connecting portions are located between adjacent ones of the at least three straight portions;
      each of the straight portions is parallel with yarns that weave the air bag; and
      the at least three straight portions comprise:
         a first straight portion and a second straight portion that are parallel to each other; and
         a third straight portion extending perpendicularly to the first straight portion and the second straight portion, the third straight portion having curved end portions for connecting to the first straight portion and the second straight portion.

2. The air bag according to claim 1, wherein each linear joined portion has one end portion.

3. The air bag according to claim 1, wherein each of the connecting portions comprises an arcuate curved portion.

4. The air bag according to claim 3, wherein the radius of curvature of the arcuate curved portion is from 3 to 10 mm.

5. The air bag according to claim 1, wherein each of the straight portions is at least 3 mm long.

6. The air bag according to claim 1, wherein each of the end portions is at least 20 mm wide.

7. The air bag according to claim 1, wherein the end portions are substantially rectangular in shape.

8. The air bag according to claim 1, wherein the end portions are substantially triangular in shape.

9. The air bag according to claim 1, wherein the inflation section has a front seat section containing at least one linear joined portion and a rear seat section containing at least one linear joint portion.

10. The air bag according to claim 1, wherein each linear joined portion has two end portions, wherein each end portion has at least three straight portions.

11. The air bag of claim 1, wherein the connecting portion is further for defining a non-inflation section.

12. An air bag comprising:
    an inflation section having opposing wall portions that become spaced apart from each other during inflation by an inflating gas; and
    linear joined portions disposed in the inflation section that linearly join the opposing wall portions, each of the linear joined portions comprising a body portion and at least one end portion, wherein:
       an outer periphery of the at least one end portion is connected to an outer periphery of the body portion;
       the at least one end portion is wider than the body portion;
       the outer periphery of the at least one end portion is defined by at least three straight portions and connecting portions, wherein the connecting portions are located between adjacent ones of the at least three straight portions; and
       each linear joined portion has three end portions that have at least three straight portions.

13. An air bag comprising:
    an inflation section having opposite wall portions that become spaced apart from each other during inflation by an inflating gas; and
    linear joined portions disposed in the inflation section that linearly join the opposing wall portions, each of the linear joined portions comprising a body portion and at least one end portion, wherein:
       an outer periphery of the at least one end portion is connected to an outer periphery of the body portion;
       the at least one end portion is wider than the body portion;
       the outer periphery of the at least one end portion is defined by at least three straight portions and connecting portions, wherein the connecting portions are located between adjacent ones of the at least three straight portions;
       the inflation section has a front seat section containing at least one linear joined portion and a rear seat section containing at least one linear joint portion; and
       the linear joined portion of the front seat section has a first linear joined portion in the shape of a T, second linear joined portion in the shape of an inverted J and a third linear joined portion in the shape of a T.

14. The air bag according to claim 13, wherein the linear joined portion of the rear seat section is in the shape of an inverted F.

* * * * *